US005319192A

United States Patent [19]

Kane et al.

[11] Patent Number: 5,319,192

[45] Date of Patent: Jun. 7, 1994

[54] WAVELENGTH DISCRIMINABLE OPTICAL SIGNAL DETECTOR INSENSITIVE TO VARIATIONS IN OPTICAL SIGNAL INTENSITY

[75] Inventors: Robert C. Kane, Scottsdale; Kevin B. Hilgers, Mesa, both of Ariz.

[73] Assignee: Motorola, Inc., Schaumburg, Ill.

[21] Appl. No.: 7,227

[22] Filed: Jan. 22, 1993

[51] Int. Cl.[5] .............. G01J 3/14; G01J 5/16

[52] U.S. Cl. .............. 250/214.1; 250/226

[58] Field of Search .............. 250/214.1, 226; 313/523, 538

[56] References Cited

U.S. PATENT DOCUMENTS

| | | | |
|---|---|---|---|
| 1,822,061 | 9/1931 | Roberts | 250/214.1 |
| 1,963,185 | 6/1934 | Wilson | 250/226 |
| 1,996,233 | 4/1935 | Darrah | 250/226 |
| 2,177,259 | 10/1939 | Keck | 250/226 |
| 2,742,550 | 4/1956 | Jenness, Jr. | 250/214.1 |
| 2,764,692 | 9/1956 | Miller | 250/226 |
| 2,936,373 | 10/1960 | Welker et al. | 250/214.1 |
| 2,965,867 | 12/1960 | Greig | 250/214.1 |

*Primary Examiner*—David C. Nelms
*Assistant Examiner*—Stephone B. Allen
*Attorney, Agent, or Firm*—Gary F. Witting; Eugene A. Parsons

[57] ABSTRACT

An optical signal detector insensitive to variations in optical signal intensity and operably discriminable with respect to signal wavelength is provided. An incident optical signal comprised of wavelength dependent information is detected to provide electronic current information substantially insensitive to variations in incoming optical signal intensity.

17 Claims, 7 Drawing Sheets

WAVELENGTH DISCRIMINABLE OPTICAL SIGNAL DETECTOR INSENSITIVE TO VARIATIONS IN OPTICAL SIGNAL INTENSITY

FIELD OF THE INVENTION

This invention relates generally to optical signal detectors and more particularly to optical signal detection apparatus and methods of application wherein optical signals of dis-similar wavelengths may be discriminably detected.

BACKGROUND OF THE INVENTION

It is known in the art that optical detectors generally are one of two types. A first type utilizes carrier pair generation (electrons and holes) in semiconductor materials to modify the associated material conductivity. A second type utilizes photoelectrons, liberated through absorption of photon energy by electrons residing at or near the surface of conductive materials.

In the instance of the first, it has been observed experimentally that modification of the conductivity of the material is directly related to the intensity of incident optical energy in addition to the wavelength of the incident energy.

In the instance of the second it is observed that the magnitude of photoelectron emission is directly related to the intensity of incident optical energy; but, above a determinate threshold level, the magnitude is relatively insensitive to the wavelength of the incident optical energy.

For many anticipated applications the operating features of the existing art, as described previously, are undesirable. Accordingly, there exists a need for an optical signal detector which overcomes at least some of these shortcomings.

SUMMARY OF THE INVENTION

These needs and others are substantially met through provision of a wavelength discriminable optical signal detector including a conductive/semiconductive material having a surface for absorbing photons and emitting electrons, an optical signal substantially comprised of photons having one of a first wavelength and a second wavelength at a specific time impinging on the surface of the conductive/semiconductive material, an anode, distally disposed with respect to the surface for collecting emitted electrons, and a source coupled between the conductive/semiconductive material and the anode for inducing an electric field on the order of $1\times10^{7}$ V/cm at the surface to provide a reduced potential barrier to facilitate quantum mechanical tunneling of electrons with finite probability, such that absorption of the photons having one of the first wavelength and the second wavelength provides one of a first current density of emitted electrons and a second current density of emitted electrons at the specific time.

These needs and others are substantially met through provision of a method of discriminating optical signals by wavelength comprising the steps of providing a wavelength discriminable optical signal detector including a conductive/semiconductive material having a surface for absorbing photons and emitting electrons, and an anode, distally disposed with respect to the surface for collecting emitted electrons, coupling a potential source between the conductive/semiconductive material and the anode for inducing an electric field on the order of $1\times10^{7}$ V/cm at the surface to provide a reduced potential barrier to facilitate quantum mechanical tunneling of electrons with finite probability, such that absorption of the photons having one of the first wavelength and the second wavelength provides one of a first current density of emitted electrons and a second current density of emitted electrons, respectively, directing an optical signal substantially comprised of photons having one of a first wavelength and a second wavelength at a specific time onto the surface of the conductive/semiconductive material to generate one of the first current density of emitted electrons and the second current density of emitted electrons, respectively, and utilizing the generated current densities to indicate which of the first and second wavelength photons was directed onto the surface of the conductive/semiconductive material.

In one embodiment of the wavelength discriminable optical signal detector of the present invention an incident optical signal may be detected to provide an electronic current which is comprised of discrete data levels that are substantially insensitive to incident signal intensity.

In another embodiment of the wavelength discriminable optical signal detector of the present invention an incident optical signal may be detected to provide an electronic current which is comprised of a continuum of data levels (analog) that are substantially insensitive to incident signal intensity.

DETAILED DESCRIPTION OF THE DRAWINGS

It is known in the art that the conductivity of semiconductor materials may be modified by providing optical energy of selected wavelength to impinge on a surface of the semiconductor and to be subsequently absorbed, at least partially, through a process which transfers the photon energy to electrons within the semiconductor material. Semiconductor materials characteristically exhibit an electron energy band structure which provides a distinct gap between allowed energy states within a valence band and those of a conduction band. A number of absorption mechanisms are possible and provide competition for absorption of the incident photon energy. These mechanisms include direct inter-band, indirect inter-band, and intra-band transitions of electrons. Interest for present consideration is restricted to transitions between valence and conduction bands via direct and in-direct transitions of electrons.

Figure 1:
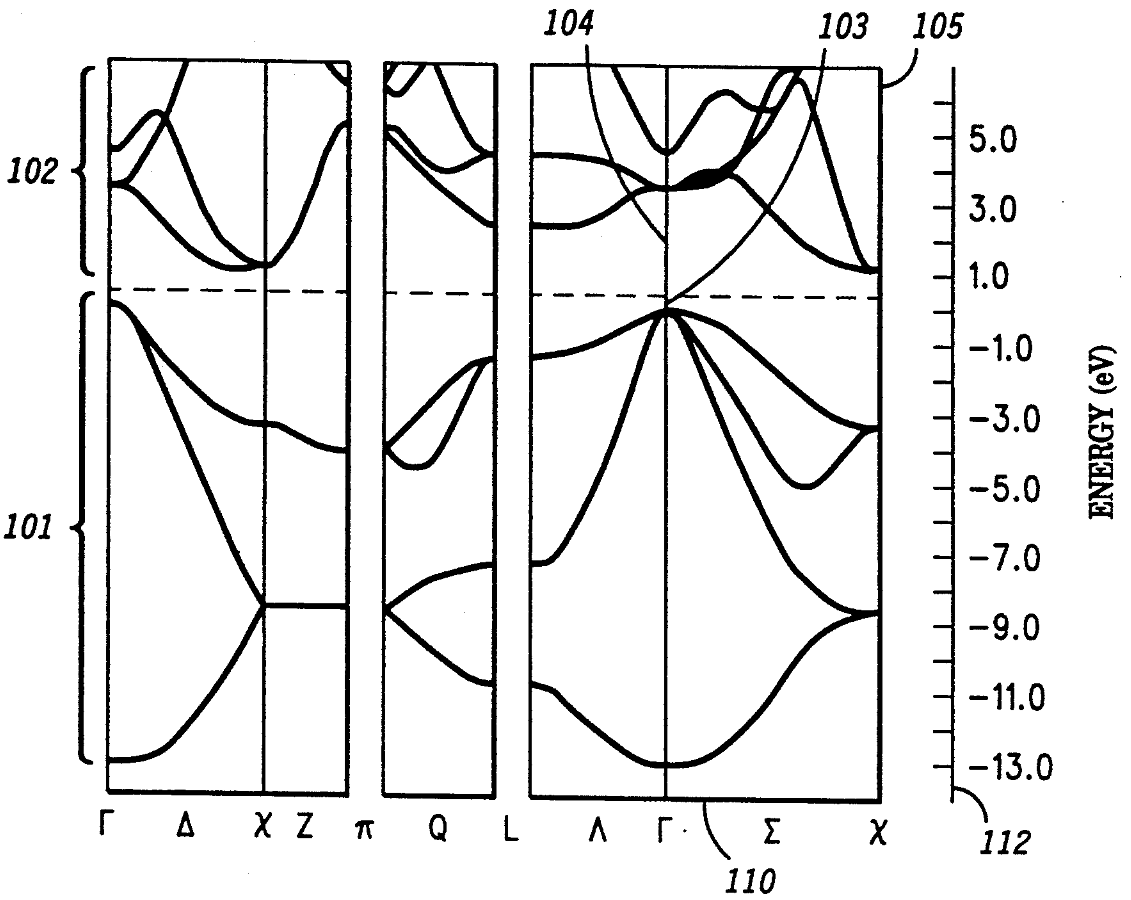
FIG. 1 is a graphic representation of the electronic energy band structure of silicon.

The bandgap structure of many semiconductor materials, and most notably silicon semiconductor material, possess an indirect band gap. FIG. 1 illustrates the energy band structure of silicon. An abscissa 110 is in units of crystal momentum and an ordinate 112 is in units of energy (eV). A plurality of valance sub-bands 101 and a plurality of conduction sub-bands 102 are depicted. It should be observed that in FIG. 1 the direct gap between the top of the valance band at a Gamma point 103 and the bottom of the conduction band at a Gamma point 104 is approximately 3.3 electron volts. Further, it should be observed that there exists an indirect gap between the top of the valance band at Gamma point 103 and the bottom of the conduction band at an X point 105 which is approximately 1.12 electron volts.

An incident optical signal has associated therewith an energy corresponding to:

$$E=h\nu \quad (1)$$

Where:

E is in terms of electron volts;

$h=4.1357\times10^{-15}$ eV*sec.; and $\nu$=frequency in cycles/second corresponding to c/lambda where $$c=3\times10^{10} \text{ cm/sec., and}$$

lambda corresponds to the wavelength of the incident optical signal in cm.

Clearly, from FIG. 1 it can be seen that in order for an electron to make a transition from the valance band to the conduction band it must acquire additional energy at least equivalent to that of the band gap. Additionally, it is necessary that any such transitions must satisfy the conservation requirements pertaining to momentum and energy.

In the instance of a transition of an electron from the top of the valance band at Gamma point 103 to the bottom of the conduction band at Gamma point 104 additional energy of approximately 3.3 electron volts and substantially no momentum must be provided. This corresponds to a direct interband transition. In the instance of a transition of an electron from the top of the valance band at Gamma point 103 to the bottom of the conduction band at X point 105 additional energy of approximately 1.12 electron volts and significant momentum must be provided. The variation in momentum (or a measure of the additional momentum which must be provided to effect a transition) is represented by the necessity to move laterally, along ordinate 110, with respect to the points of interest.

For incident optical energy of less than approximately 3.3 electron volts transitions from the valance band to the conduction band will be indirect transitions. These transitions have the additional effect that electrons elevated to the conduction band corresponding to the region near X point 105 will thermalize (emit phonons) to occupy the lowest energy state within the conduction band to the maximum extent possible. The effect is to increase the conduction band energy state occupancy near the energy minimum of the conduction band. Thus, indirect energy band transitions for indirect gap semiconductor materials, corresponding to absorption of an incident optical signal having photon energy less than the energy difference of the direct gap, results in the generation of charge carrier pairs (electron-hole pairs) with electron energies corresponding nearly to that of the conduction band minimum. The increased density of charge carrier pairs provides for an increase in material conductivity.

For direct gap semiconductors (having a conduction band minimum corresponding to the same crystal momentum as the valance band maximum), such as gallium-arsenide, absorption of optical energy will provide substantially similar effects via direct interband transitions.

In either instance it is observed that the variations in conductivity which result from absorption of incident optical signal energy (photon energy) are related directly to the intensity of the incident signal. For example, an incident optical signal corresponding to an intensity of 0.5 Watts and a wavelength of 530 nano-meters results in an incident photon dose of $1.34\times10^{18}$ photons per second while an intensity corresponding to 1.0 Watt yields $2.68\times10^{18}$ photons per second. Since generation of carrier pairs is dependent on incident photon arrival rate, the conductivity is directly related to incident signal intensity and varies accordingly. Because materials having the characteristics of interest (explained fully herein) may be technically considered a conductor or a semiconductor, the term "conductor/semiconductor material" has been coined to include any material having the characteristics of interest.

Figure 2:
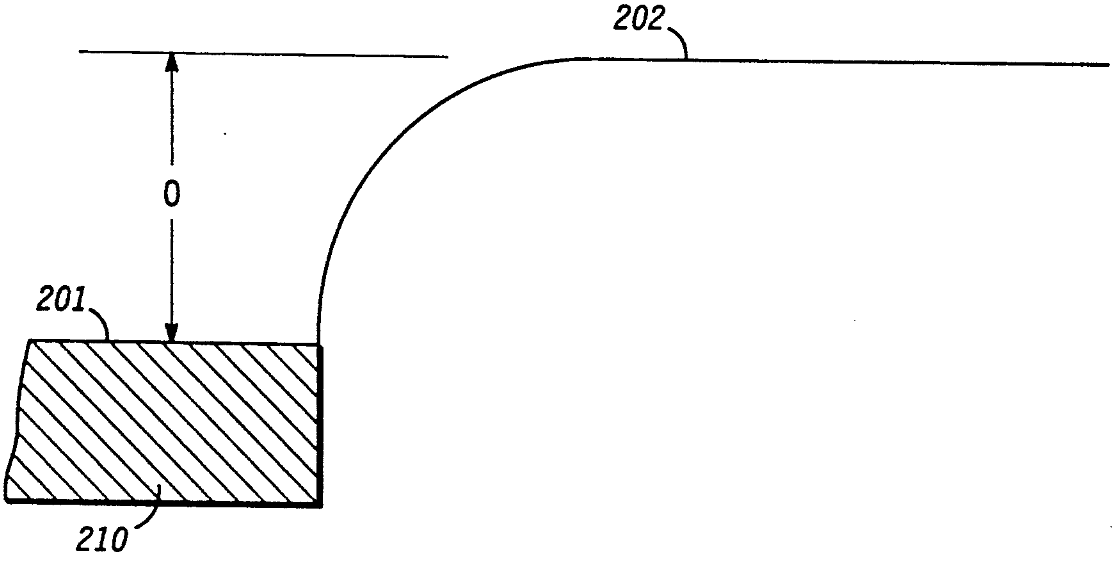
FIG. 2 is an energy diagram of a surface potential barrier for a conductor/semiconductor - vacuum system.

Conductive/semiconductive materials have associated therewith a surface potential barrier, typically on the order of a few (2–5) electron volts which impedes the escape of electrons associated with the material into a surrounding free space region. A mechanism for overcoming such a potential barrier is to provide sufficient energy to electrons in the material near the surface such that said electrons overcome the potential barrier. FIG. 2 is schematic representation of a conductive/semiconductive material 210 having an energy level corresponding to a Fermi energy level 201 and an associated vacuum energy level 202. The difference between Fermi energy level 201 and vacuum energy level 202 is the magnitude of the energy which must be provided to electrons in the material so that they may overcome the potential barrier and is commonly referred to as the material work function, $\phi$.

An optical signal incident on the surface of a material may induce photoemission provided that the photon energy is at least sufficient to provide the minimum energy required so that an electron which absorbs a photon may be excited to an energy state equal to or greater than the energy level of vacuum energy level 202. It is clear from FIG. 2 that if the minimum energy requirement is satisfied photoelectric emission will be initiated. It is also known that the photoelectric emission is independent (above the minimum energy level) of wavelength of incident energy. For incident signals of photon energy equal to or greater than the threshold level (energy minimum corresponding to a maximum photon wavelength), or work function ($\phi$), the photoemission increases proportionately with incident signal intensity.

From the preceding it can be seen that: 1) with optical signal detectors utilizing photoconductive mechanisms the detection is directly related to signal intensity and not directly related to wavelength; and 2) with optical signal detectors utilizing photoelectric mechanisms the detection is threshold (minimum photon energy) limited, effectively insensitive to wavelength variations, and directly dependent on signal intensity.

In addition to depicting the energy level differences as described previously, FIG. 2 also depicts that the potential barrier is infinite in extent. That is, although the potential barrier is finite in height (corresponding to the energy difference between Fermi energy level 201 and vacuum energy level 202) it is infinite in width which means that an electron may not pass through the barrier but must escape by going over the barrier.

Schottky (Z. f. Physik vol. 14, p. 80, 1923) initially proposed and Fowler & Nordheim (Proceedings of the Royal Society, London, A 119, p. 173, 1928) formalized the concept that the extent of the potential barrier may be reduced to provide for a finite probability that electrons may tunnel through the barrier, in a quantum mechanical sense, to escape into the free space region.

The Fowler-Nordheim relation employs a tunneling coefficient $$T=\exp[-6.85\times10^{7}(\phi)^{3/2}/E] \quad (2)$$

to describe the probability, $|T|^2$, that an electron disposed in a material and near a surface of the material may quantum mechanically tunnel through the barrier to be emitted into a surrounding free space region. Notice that tunneling coefficient T is dependent on a material work function, $\phi$, corresponding to a potential barrier height, which has been defined previously with reference to FIG. 2 as the difference between Fermi energy level 201 and vacuum energy level 202, and an electric field, E, which is induced at the surface of the material.

From the relation for tunneling coefficient T it can be seen that tunneling probability increases by decreasing the material work function, $\phi$, or increasing the electric field, E, at the surface of the material. It is known that for other than thermionic emission, which may be represented as $J=AT^2\exp[-b^*\phi/T]$, the highest energy level of occupied energy states corresponds substantially to the Fermi energy level. The significance is that tunneling coefficient T is substantially independent of temperature for conditions below approximately 1500 degrees C. and dependent substantially on work function, $\phi$, and induced electric field, E.

Figure 3:
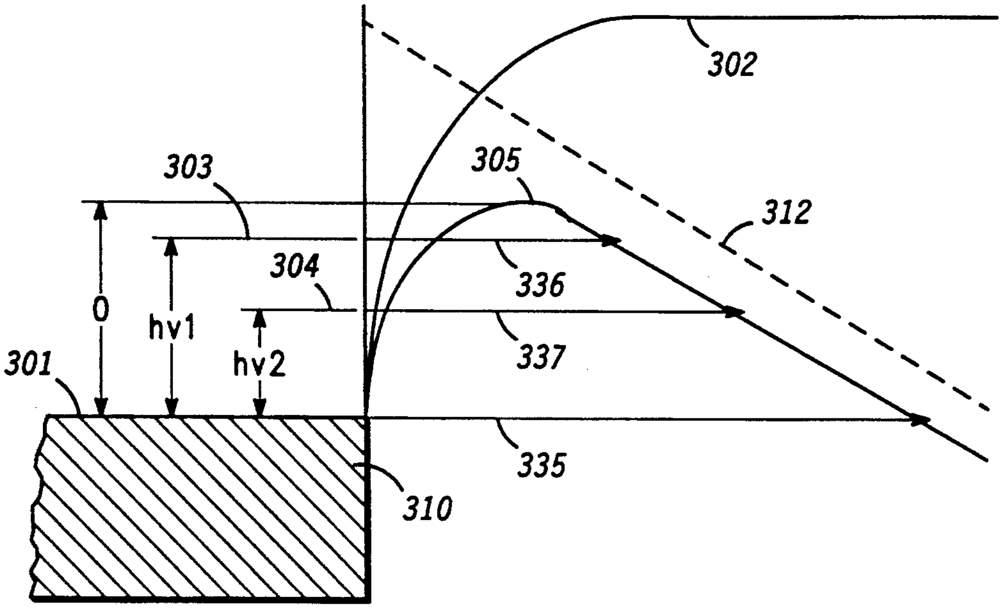
FIG. 3 is an energy diagram for a conductor/semiconductor - vacuum system with a reduced surface potential barrier.

FIG. 3 is an energy diagram which corresponds to a potential barrier 302 related to a surface electron energy (Fermi energy level) 301 of a conductive/semiconductive material 310 and having associated therewith an induced electric field 312 (represented by a broken line). Observe that electric field 312 induced at the material surface results in a modification to potential barrier 302 such that the extent of a reduced potential barrier 305 is now finite (in the quantum mechanical sense) and therefore the probability that an electron may tunnel through the barrier is also finite.

FIG. 3 further depicts that a first electron energy level 303 corresponding to an energy level of an electron above the Fermi energy level 301 has a work function which may be described as $(\phi-h\nu_1)$ which is an electron which has undergone photon absorption corresponding to a photon energy of $h\nu_1$. A second energy level 304 corresponding to an energy level of an electron above the Fermi energy level 301 has a work function which may be described as $(\phi-h\nu_2)$ which is an electron which has undergone photon absorption corresponding to a photon energy of $h\nu_2$.

It can be seen that the tunneling coefficient may be modified accordingly to $$T=\exp[-6.85\times10^{7}(\phi-h\nu)^{3/2}/E] \quad (3)$$

which describes that the tunneling probability is also a function of absorbed photon energy. Observe from equation (3) above that tunneling coefficient T will vary with the modified work function $(\phi-h\nu)$ and, therefore, with photon energy (corresponding to, for example, an incident signal wavelength).

Figure 4:
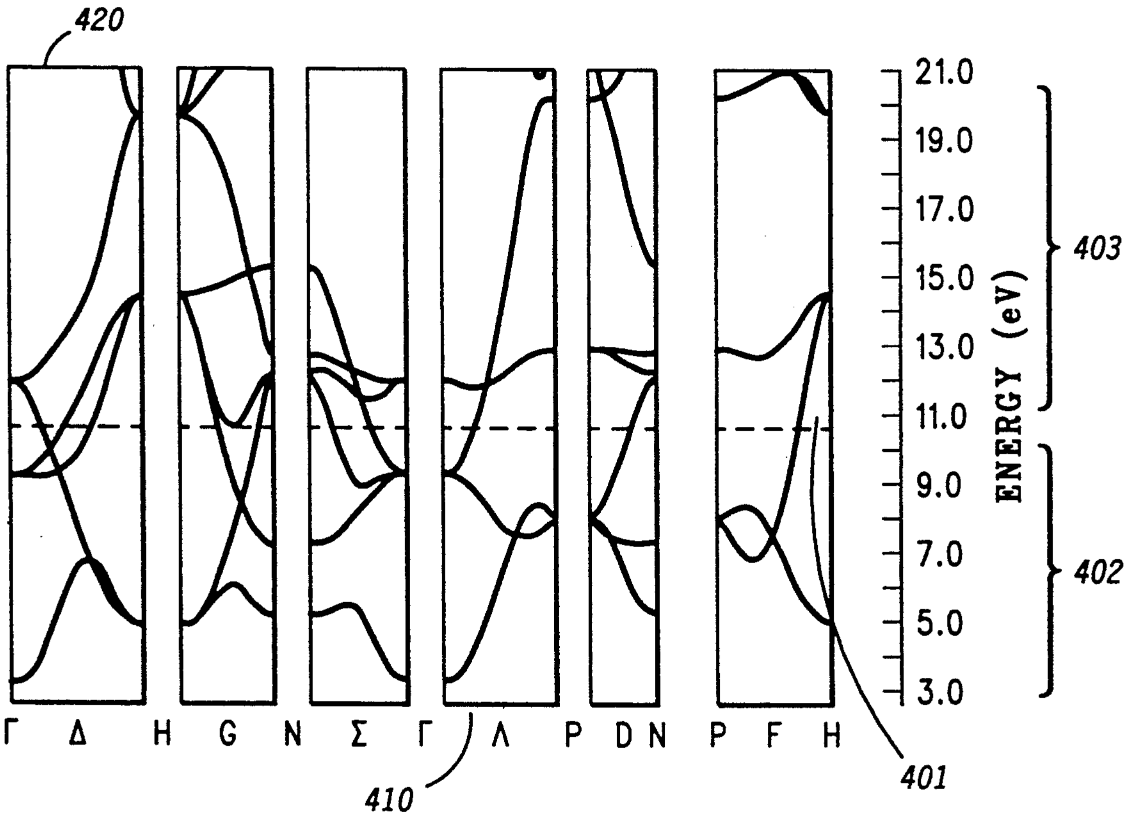
FIG. 4 is a graphic representation of an electronic energy band structure for molybdenum.

It remains to provide a conductive/semiconductive material which exhibits an energy band structure suitable for photon energy absorption corresponding to the wavelength of incident optical signal information. FIG. 4 depicts such an energy band structure which, for one example, is the band structure of molybdenum. FIG. 4 is a graphic representation of the allowed energy states for molybdenum with crystal momentum, k, as an abscissa 410 and electron energy, E, as an ordinate 420. A Fermi energy level ($E_F$) 401 is defined as the energy level corresponding to the highest energy of an occupied (by electrons) energy state in the conduction band. For the illustration of FIG. 4, each of the plurality of energy bands is a conduction sub-band. Those below Fermi energy level 401 are occupied conduction sub-bands 402. Those above Fermi energy level 401 are substantially unoccupied energy sub-bands 403.

In order for photon energy to be absorbed by an electron there must be an energy gap (preferably direct) between an occupied energy state in one occupied conduction sub-band 402, typically at or below Fermi energy level 401, and an un-occupied energy state in one un-occupied conduction sub-band 403 above Fermi energy level 401. FIG. 4 depicts that molybdenum provides for such direct transitions with transition energies between occupied to unoccupied sub-bands corresponding to absorbed photon energies having optical signal wavelengths in the visible portion of the frequency spectrum (i.e., from approximately 1.5–3 electron volts, eV, or from approximately 800–400 nanometers). Further, FIG. 4 illustrates that the density of states (density of allowed discrete electron energy levels in accordance with wave equation eigenvalues and the exclusion principle), which is directly related to $\delta^2E/\delta k^2$, is high in the regions corresponding to sub-bands 403, 402 above and below Fermi energy level 401 and having crystal momentum close to that corresponding to one of the Gamma, Delta, and Sigma points on ordinate 420.

Referring once again to FIG. 3, Fermi energy level 301 is, for example, approximately 10.0 electron volts and vacuum energy level 302 is approximately 14.5 electron volts. This provides a potential barrier of approximately 4.5 electron volts. For the present example, electric field 312 is induced at the surface of material 310, by any of many methods known in the art such as for example a voltage source, and having a magnitude of $1.5\times10^7$ V/cm. Placing these values in equation (3) results in $$T=\exp[-6.85\times10^7 \cdot 4.5^{3/2}/(1.5\times10^7)]=1.16\times10^{-19}$$

which tunneling through reduced potential barrier 305 is graphically represented by an arrow 335 in FIG. 3.

When an externally provided optical signal having a wavelength corresponding to photon energy $h\nu_1$ impinges on the surface of material 310, electrons at or near the surface absorb photons thereby acquiring additional energy to occupy previously unoccupied energy states up to approximately $E_F+h\nu_1$, where $E_F$ is the energy corresponding to Fermi energy level 301, depicted as first electron energy level 303. When an externally provided optical signal having a wavelength corresponding to photon energy $h\nu_2$ impinges on the surface of material 310, electrons at or near the surface absorb photons thereby acquiring additional energy to occupy previously unoccupied energy states up to approximately $E_F+h\mu_2$, depicted as second electron energy level 304.

As another example and referring once again to FIG. 3, assume Fermi energy level 301 is approximately 10.0 electron volts, vacuum energy level 302 is approximately 14.5 electron volts, and $h\nu_1$ is approximately 2.33 ev. This provides a potential barrier of approximately 2.17 electron volts. If, for the present example, an electric field is induced at the surface of material 310 having a magnitude of $1.5\times10^7$ V/cm, equation (3) becomes $$T=\exp[-6.85\times10^7 \cdot 2.17^{3/2}/(1.5\times10^7)]=1.88\times10^{-5}$$

which tunneling through the reduced potential barrier 305 is graphically represented by an arrow 336 in FIG. 3.

For a further example and referring once again to FIG. 3, assume Fermi energy level 301 is approximately 10.0 electron volts, vacuum energy level 302 is approximately 14.5 electron volts, and $h\nu_2$ is approximately 2.2 ev. This provides a potential barrier of approximately 2.3 electron volts. If, for the present example, an electric field is induced at the surface of material 310 having a magnitude of $1.5\times10^7$ V/cm., equation (3) becomes $$T=\exp[-6.85\times10^7 \cdot 2.3^{3/2}/(1.5\times10^7)]=1.2\times10^{-7}$$

which tunneling through the reduced potential barrier 305 is graphically represented by an arrow 337.

Clearly, the tunneling probability is differentiable and related to the wavelength and, consequently, to the photon energy of the impinging optical signal.

The tunneling coefficient may be employed in an equation to determine emitted electron current density as, $$J=(3.84\times10^{-11} \cdot E_F/[(\phi-h\nu)+E_F]^2 \cdot (\phi-h\nu)) \cdot E^2 \cdot \exp[-6.85\times10^{-7} \cdot (\phi-h\nu)^{3/2}/E \tag{4}$$

For the example now under consideration and with substantially no incident optical signal we find:

$$J_{(h\nu=0)}=1.12\times10^{-11}\ \text{A/cm}^2$$

However, with an incident optical signal corresponding to $h\nu_1$ or $h\nu_2$ we have, respectively:

$$J_{(h\nu=h\nu1)}=112.4\ \text{A/cm}^2$$

$$J_{(h\nu=h\nu2)}=28.55\ \text{A/cm}^2$$

From the example just concluded it can be observed that for the instance of no appreciable optical signal impingement the current density, $J_{(h\nu=0)}$, can be taken as a base level indicative of an OFF level. With an incident optical signal corresponding to either of $h\nu_1$ or $h\nu_2$ the current densities, $J_{(h\nu=h\nu1)}$ or $J_{(h\nu=h\nu2)}$, may be taken as an ON level. Further, the current densities, $J_{(h\nu=h\nu1)}$ and $J_{(h\nu=h\nu2)}$, are clearly discriminably determined. That is, it may be clearly determined that the incident optical signal is either $h\nu_1$ or $h\nu_2$ by observing the resultant electron current density from the optical signal detector.

Further, we observe from equation (4) above that the emitted current density, J, is independent of incident signal intensity provided that photon absorption is adequate to modify the work function, $\phi$, by $h\nu$ as indicated.

A wavelength discriminable signal detection apparatus as hereinabove described may be usefully applied to provide optical signal information to electrical signal information conversion through the transformation of optical (photon) energy to an electron current corresponding to the wavelength of the optical signal.

Figure 5:
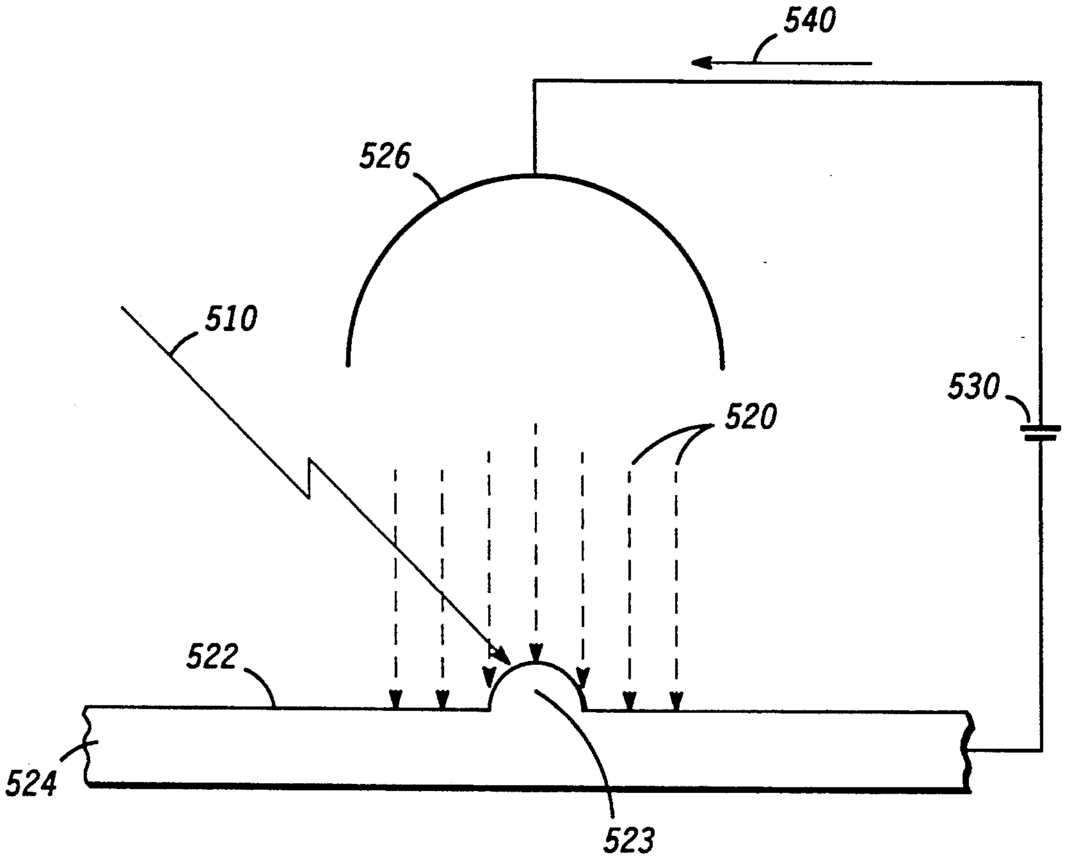
FIG. 5 is a schematic/cross-sectional representation of an embodiment of a wavelength discriminable optical signal detector in accordance with the present invention.

FIG. 5 is a schematic/cross-sectional representation of an embodiment of a wavelength discriminable optical detector 500 in accordance with the present invention. An externally provided optical signal 510, provides a photon flux wherein the photons have an energy corresponding to a wavelength. Apparatus for providing optical signal 510 are known in the art and may include, for example, optical energy emanating from a fiber optic cable, a laser, etc. An externally provided electric field 520 is induced at a surface 522 of a conductive/-semiconductive material 524. Electric field 520 is of polarity and magnitude (on the order of $1\times10^7$ V/cm) to effect a modification to the extent of a potential barrier (described previously with reference to FIG. 3) associated with surface 522 such that a finite probability exists that quantum mechanical tunneling of electrons through the barrier will occur. For the purposes of the present embodiment electric field 520 is induced by an externally provided potential source 530, which in this instance includes a voltage source.

It is known in the art that structures may be realized which provide for enhancement of induced electric fields and that such electric field enhancement is typically realized at a region of geometric discontinuity of small radius of curvature 523, such as a sharp tip or edge on the order of approximately 1000 Å or less radius of curvature. This electric field enhancement provides for operation of wavelength discriminable optical detector 500 at voltages, provided by source 520, on the order of from 10 to 100 volts.

FIG. 5 further depicts that source 530 is operably connected between material 524, which material 524 will emit electrons in accordance with the wavelength (energy) of any impinging photons of any incident optical signal, and an anode 526, distally disposed with respect to material 524. Anode 526 desirably collects emitted electrons which electrons comprise an electrical current 540.

Figure 6:
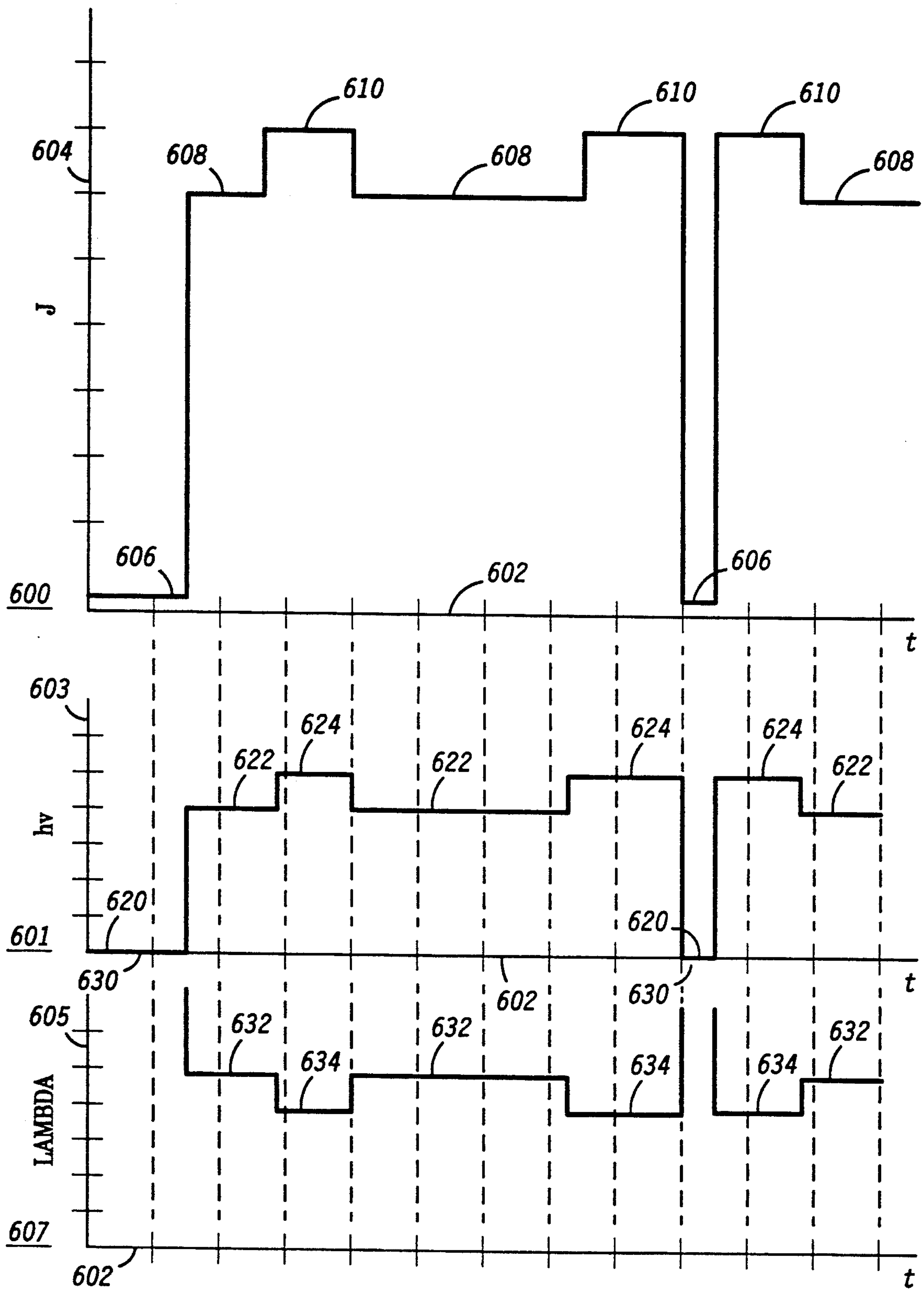
FIG. 6 is a graphic representation of operation of the wavelength discriminable optical signal detector of FIG. 5.

FIG. 6 is a graphic representation, comprised of three discrete graphs exhibiting a time relationship, of the operation of wavelength discriminable optical detector 500. A first graph 600 is shown having an ordinate 602 set out in units corresponding to a period of time, t, and an abscissa 604 set out in units corresponding to an emitted electron current density, J. A second graph 601 has a similar ordinate 602 as that of graph 600 and an abscissa 603 in units of energy, $h\nu$. A third graph 607 has a similar ordinate 602 as the graph 600 and an abscissa set out in units of lambda (wavelength) 605. For graphs 600, 601 and 607, a time relationship exists wherein current density J, depicted in graph 600, is related to energy $h\nu$ of incident optical energy, depicted in graph 601, and related to wavelength (lambda) 605, depicted in graph 607.

A first current density 606, corresponds to a current density of an OFF mode (level) and is determined by an incident optical signal having substantially no photon energy 620, within a spectral range of interest, and infinite lambda 630 for a correlated sub-period of time. A second current density 608, corresponding to a current density of a first ON mode, is correlated to an incident optical signal comprised of photons having a photon energy 622 and lambda 632 for another sub-period of time. A third current density 610, corresponding to the current density of a second ON mode (level) is correlated to an incident optical signal comprised of photons having another photon energy 624 and lambda 634 for yet another sub-period of time. The first current density 606 corresponds to substantially no incident optical signal, within the spectral range of interest. The second current density 608 corresponds substantially to an incident optical signal comprised of photons having a first wavelength, $h\nu_1$. The third current density 610 corresponds substantially to an incident optical signal comprised of photons having a second wavelength, $h\nu_2$.

It is apparent from graphs 600, 601, 607 that the current densities 606, 608, 610 are discriminable and related to the wavelength (lambda) of an incident optical signal. Wavelength discriminable optical detector 500, operated as described with reference to FIG. 6, and embodied as described with reference to FIG. 5, is useful as a multi-level information (data) detector.

Figure 7:
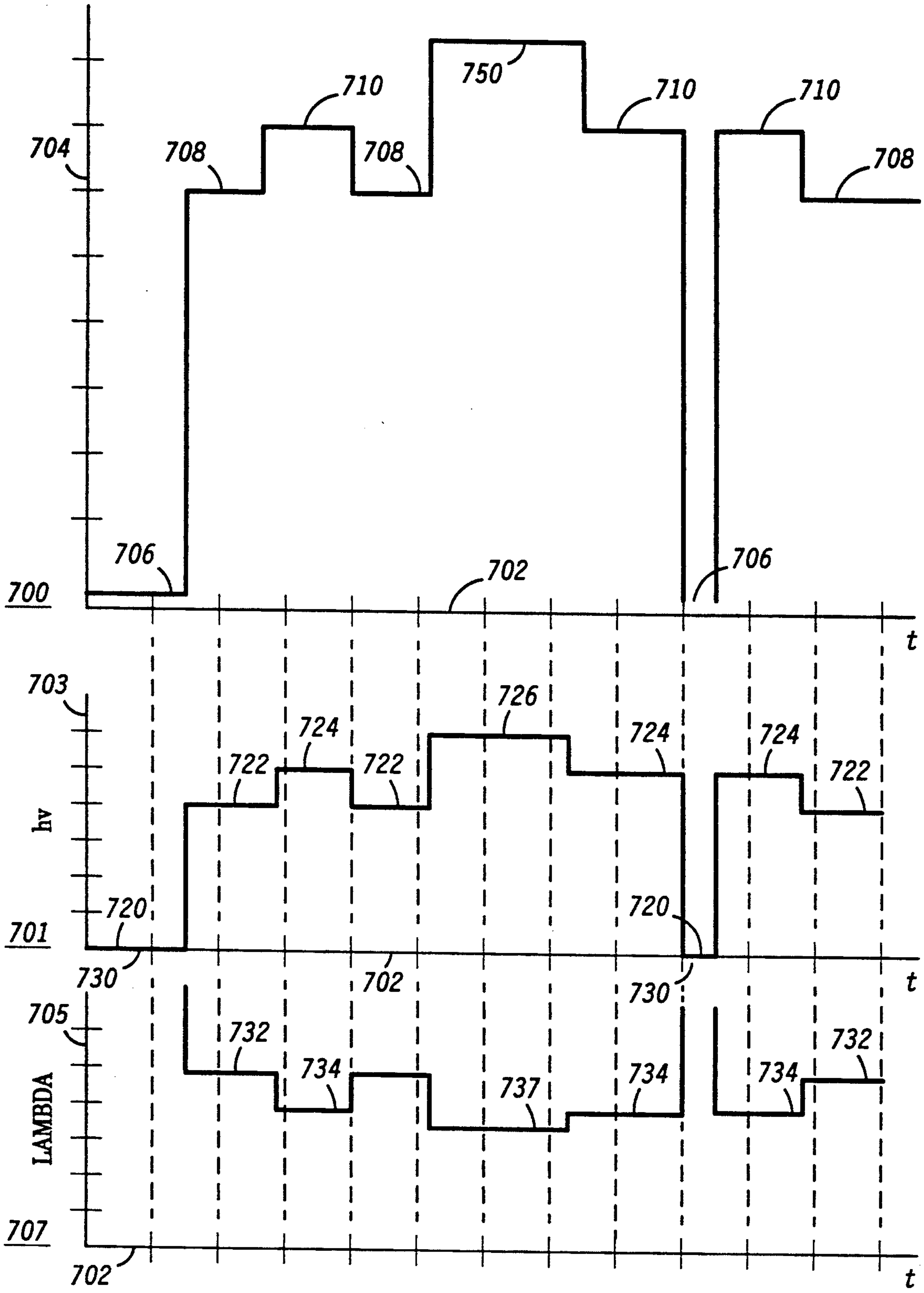
FIG. 7 is another graphic representation of operation of the wavelength discriminable optical signal detector of FIG. 5.

FIG. 7 is a graphic representation of the operation of wavelength discriminable optical detector 500 similar to that described previously with reference to FIG. 6 and wherein features previously identified with reference to FIG. 6 are similarly referenced beginning with the numeral "7". In FIG. 7 a fourth current density 750 corresponding to a current density of a third ON mode is depicted and is correlated to an incident optical signal comprised of photons having yet another photon energy 726 and lambda 737 for yet another sub-period of time. Fourth current density 750 corresponds substantially to an incident optical signal comprised of photons having a third wavelength, $h\nu_3$. As can be seen in FIG. 7, increasing the number of wavelengths of which the optical signal may be sequentially comprised provides for a plurality of discriminable detectable current densities.

Figure 8:
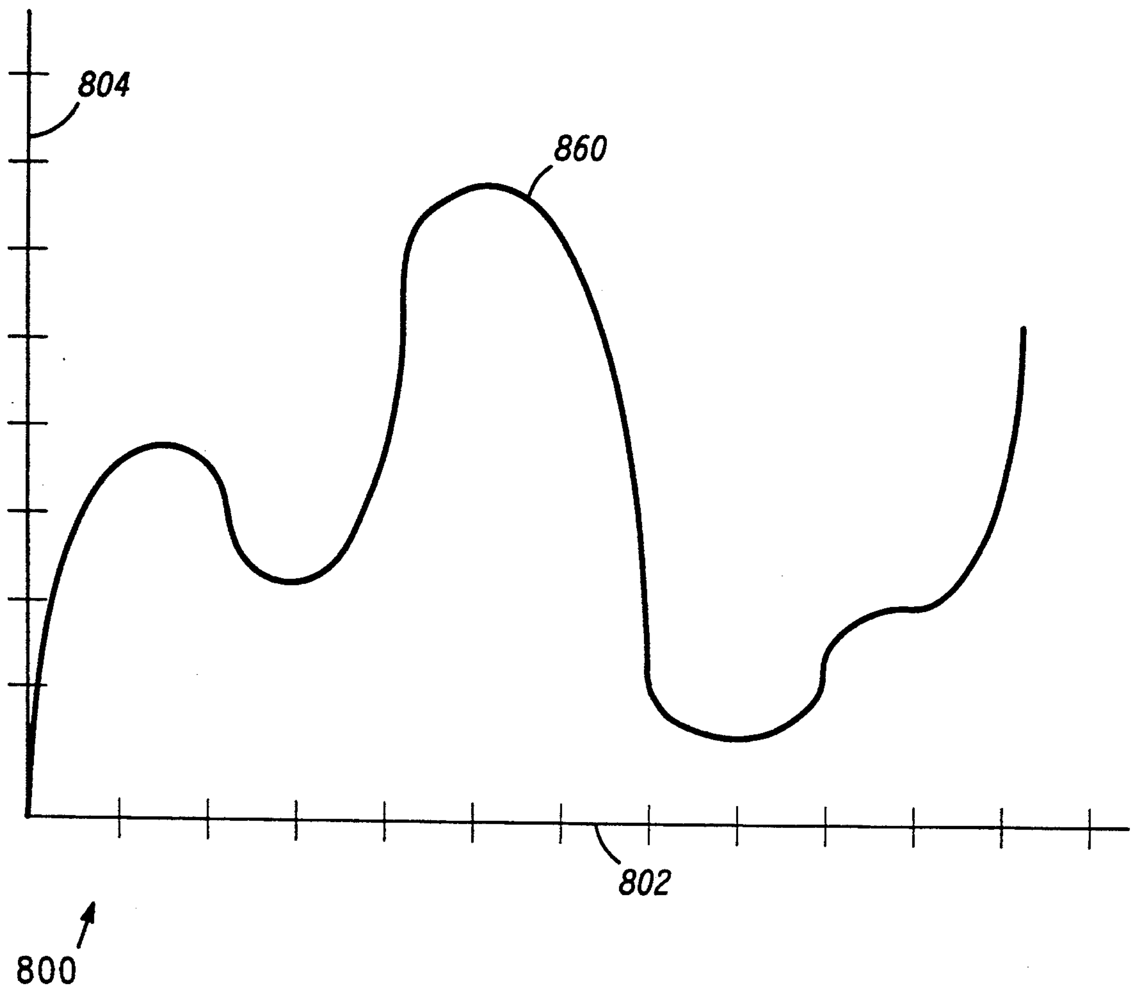
FIG. 8 is yet another graphic representation of operation of the wavelength discriminable optical signal detector of FIG. 5.

FIG. 8 is a graphic representation 800 of another operation of wavelength discriminable optical detector 500. Graphic representation 800 is shown having an ordinate 802 set out in units corresponding to a period of time, t, and an abscissa 804 set out in units corresponding to an emitted electron current density, J. An incident optical signal 510, which is sequentially comprised of at least some components of a continuum of wavelengths over some desired portion of the optical spectrum, provides an analog electronic current. The magnitude of a current density 860 is dependent on the wavelength of incident optical signal 510 as described previously with reference to FIGS. 3, 6, and 7.

Figure 9:
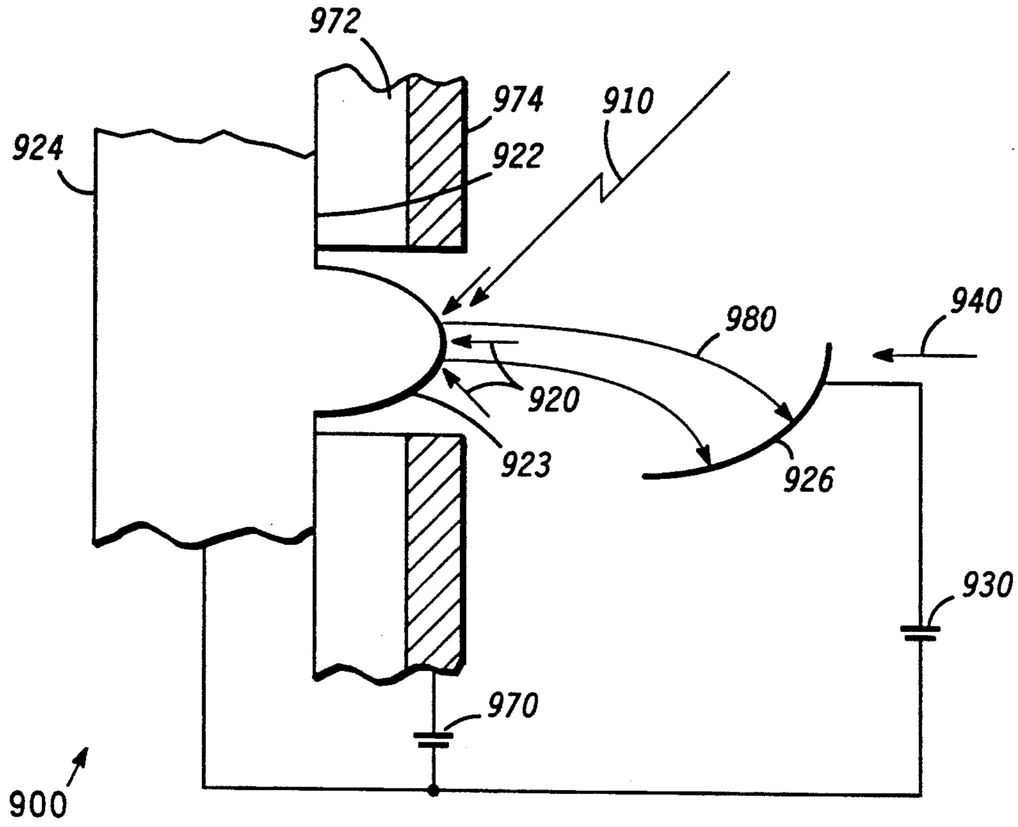
FIG. 9 is a schematic/cross-sectional representation of another embodiment of a wavelength discriminable optical signal detector in accordance with the present invention.

FIG. 9 is a schematic/cross-sectional representation of another embodiment 900 of the present invention wherein features previously identified in FIG. 5 are similarly referenced beginning with the numeral "9". Embodiment 900 further includes a first anode 974, a second potential source 970, which may be realized by a voltage source, and an insulator layer 972 positioned between material 924 and anode 974. Source 530 of FIG. 5 is illustrated in FIG. 9 as a first potential source 930 and anode 526 of FIG. 5 is illustrated in FIG. 9 as a second anode 926, for collecting emitted electrons 980 and distally disposed with respect to geometric discontinuity of small radius of curvature 923. Source 970 is operably connected between material 924 and anode 974. Geometric discontinuity of small radius of curvature 923 is formed in surface 922 to provide for the enhancement of electric field 920, which electric field 920 is induced by the operable connection of source 970. Insulator layer 972 is disposed on the surface 922 and anode 974 is disposed on insulator layer 972 and proximally with respect to geometric discontinuity 923.

Figure 10:
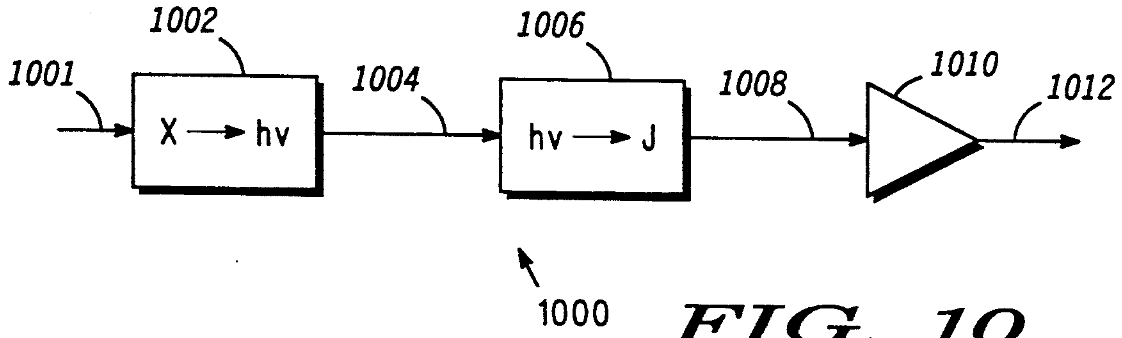
FIG. 10 is a block diagram of an optical detection system employing an optical signal detector in accordance with the present invention.

FIG. 10 is a block diagram of an optical information detection system 1000 employing a wavelength discriminable optical detector in accordance with the present invention. An incoming signal 1001 which may be, for example, one of an electronic and mechanical signal is operably connected to a first energy conversion network 1002 wherein incoming signal 1001 is converted to an optical signal, $h\nu$. Optical signal, $h\nu$, is transmitted via any of many known transmission means 1004, such as for example fiber optic cable, optical waveguide, free-space transmission, laser, etc, and subsequently received as an incident optical signal at a wavelength discriminable optical signal detector 1006 of the present invention. A function of wavelength discriminable optical signal detector 1006 is to detect and convert incident optical signal energy to an emitted electron current corresponding to an emitted current density, J, related to the wavelength of the photons which comprise the incident optical signal. The emitted electron current is subsequently applied to succeeding electronic networks 1010 via a conductive path 1008. Electronic networks 1010 may provide any of many functions including, for example, one of data processing and data memory. One of the emitted electron current or a derivative thereof may be transmitted as an output signal 1012 from electronic networks 1010. The incoming signal 1001 may be selectively varied such that the first energy conversion network 1002 provides a related variation in optical signal, $h\nu$ and, at the system output signal, a corresponding variation in electron current.

Figure 11:
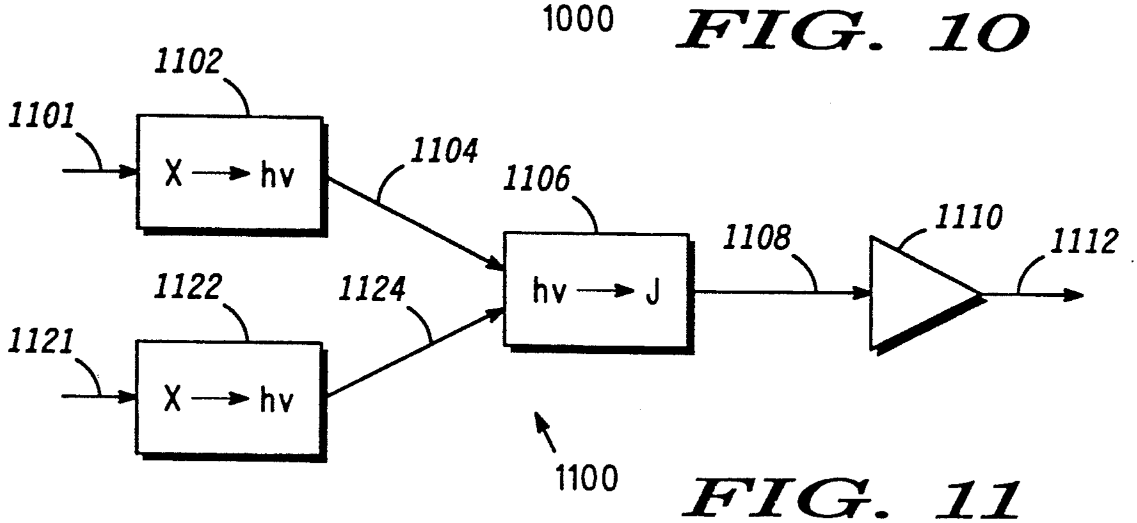
FIG. 11 is a block diagram of another optical detection system employing an optical signal detector in accordance with the present invention.

FIG. 11 is a block diagram of another optical information detection system 1100 employing a wavelength discriminable optical detector in accordance with the present invention and wherein features previously identified with reference to FIG. 10 are similarly referenced beginning with the numeral "11". In system 1100 another incoming signal 1121 which may be, for example, one of an electronic and mechanical signal is operably connected to a second energy conversion network 1122. The optical signal, hν, generated in the second energy conversion network 1122 is transmitted via a transmission means 1104 and subsequently received as an incident optical signal at wavelength discriminable optical signal detector 1106. The incoming signals 1101, 1121 may be selectively varied such that the first and second energy conversion networks 1102 and 1122 provide a related variation in optical signal, hν and, at the system output signal, a corresponding variation in electron current. The number of incoming signals and conversion networks may be extended to more than two.

It should be understood that, for the purposes of operation of the wavelength discriminable optical detector of the present disclosure, the term "no incident optical signal" refers to the optical frequency range over which the apparatus may usefully detect incident signals and is not a limitation to include/exclude non-absorbed photon energy components.

What is claimed is:

1. A wavelength discriminable optical signal detector comprising:

a conductive/semiconductive material having a surface with a geometric discontinuity having a radius of curvature on the order of less than 1,000 angstroms for absorbing photons and emitting electrons;

an optical signal substantially comprised of photons having one of a first wavelength and a second wavelength at a specific time impinging on the surface of the conductive/semiconductive material;

an anode, distally disposed with respect to the surface for collecting emitted electrons; and a source coupled between the conductive/semiconductive material and the anode for inducing an electric field on the order of $1\times10^7$ V/cm at the surface to provide a reduced potential barrier to facilitate quantum mechanical tunneling of electrons with finite probability, such that absorption of the photons having one of the first wavelength and the second wavelength provides one of a first current density of emitted electrons and a second current density of emitted electrons at the specific time.

2. A wavelength discriminable optical signal detector as claimed in claim 1 wherein the geometric discontinuity is a tip.

3. A wavelength discriminable optical signal detector as claimed in claim 1 wherein the geometric discontinuity is an edge.

4. A wavelength discriminable optical signal detector comprising:

a conductive/semiconductive material having a surface for absorbing photons and emitting electrons;

an optical signal substantially comprised of photons having one of a first wavelength and a second wavelength at a specific time impinging on the surface of the conductive/semiconductive material;

an anode, distally disposed with respect to the surface for collecting emitted electrons; and a source coupled between the conductive/semiconductive material and the anode for inducing an electric field on the order of $1\times10^7$ V/cm at the surface to provide a reduced potential barrier to facilitate quantum mechanical tunneling of electrons with finite probability, such that absorption of the photons having one of the first wavelength and the second wavelength provides one of a first current density of emitted electrons and a second current density of emitted electrons at the specific time, wherein over a period of time the optical signal is sequentially comprised of photons having none of and one of the first and second wavelengths such that associated current densities correspond to one of an OFF mode, a first ON mode and a second ON mode, respectively.

5. A wavelength discriminable optical signal detector as claimed in claim 4 wherein the associated current densities provide discrete levels of data information.

6. A wavelength discriminable optical signal detector as claimed in claim 4 wherein the first and second wavelengths include a continuum of wavelengths over a portion of the optical spectrum such that the current density of emitted electrons is an analog electronic current.

7. A wavelength discriminable optical signal detector comprising:

a conductive/semiconductive material having a surface with a geometric discontinuity having a radius of curvature on the order of less than 1,000 angstoms for absorbing photons and emitting electrons;

an optical signal substantially comprised of photons having one of a first wavelength and a second wavelength at a specific time impinging on the surface of the conductive/semiconductive material;

a first anode proximally disposed with respect to the surface;

a first potential source coupled between the conductive/semiconductive material and the first anode for inducing an electric field on the order of $1\times10^7$ V/cm at the surface of the conductive/semiconductive material to provide a reduced potential barrier for facilitating quantum mechanical tunneling of electrons with finite probability and;

a second anode distally disposed with respect to the surface of the conductive/semiconductive material for collecting emitted electrons; and a second potential source coupled between the conductive/semiconductive material and the second anode, such that absorption of photons having one of the first wavelength and second wavelength provides one of a first current density of emitted electrons and a second current density of emitted electrons at the specific time.

8. A wavelength discriminable optical signal detector as claimed in claim 7 wherein the geometric discontinuity is a tip.

9. A wavelength discriminable optical signal detector as claimed in claim 7 wherein the geometric discontinuity is an edge.

10. A wavelength discriminable optical signal detector comprising:

a conductive/semiconductive material having a surface for absorbing photons and emitting electrons;

an optical signal substantially comprised of photons having one of a first wavelength and a second wavelength at a specific time impinging on the surface of the conductive/semiconductive material;

a first anode proximally disposed with respect to the surface;

a first potential source coupled between the conductive/semiconductive material and the first anode for inducing an electric field on the order of $1\times10^7$ V/cm at the surface of the conductive/semiconductive material to provide a reduced potential barrier for facilitating quantum mechanical tunneling of electrons with finite probability and;

a second anode distally disposed with respect to the surface of the conductive/semiconductive material for collecting emitted electrons; and a second potential source coupled between the conductive/semiconductive material and the second anode, such that absorption of photons having one of the first wavelength and second wavelength provides one of a first current density of emitted electrons and a second current density of emitted electrons at the specific time wherein over a period of time the optical signal is sequentially comprised of photons having none of and one of the first and second wavelengths such that associated current densities correspond to one of an OFF mode, a first ON mode and a second ON mode, respectively.

11. A wavelength discriminable optical signal detector as claimed in claim 10 wherein the associated current densities provide discrete levels of data information.

12. A wavelength discriminable optical signal detector as claimed in claim 10 wherein the first and second wavelengths include a continuum of wavelengths over a portion of the optical spectrum such that the current density of emitted electrons is an analog electronic current.

13. A method of discriminating optical signals by wavelength comprising the steps of:

providing a wavelength discriminable optical signal detector including a conductive/semiconductive material having a surface with a geometric discontinuity for absorbing photons and emitting electrons, and an anode, distally disposed with respect to the surface for collecting emitted electrons;

coupling a potential source between the conductive/semiconductive material and the anode for inducing an electric field on the order of $1\times10^7$ V/cm at the surface to provide a reduced potential barrier to facilitate quantum mechanical tunneling of electrons with finite probability, such that absorption of the photons having one of the first wavelength and the second wavelength provides one of a first current density of emitted electrons and a second current density of emitted electrons, respectively;

directing an optical signal substantially comprised of photons having one of a first wavelength and a second wavelength at a specific time onto the surface of the conductive/semiconductive material to generate one of the first current density of emitted electrons and the second current density of emitted electrons, respectively; and utilizing the generated current densities to indicate which of the first and second wavelength photons was directed onto the surface of the conductive/semiconductive material.

14. A method of discriminating optical signals by wavelength comprising the steps of:

providing a wavelength discriminable optical signal detector including a conductive/semiconductive material having a surface for absorbing photons and emitting electrons, and an anode, distally disposed with respect to the surface for collecting emitted electrons;

coupling a potential source between the conductive/semiconductive material and the anode for inducing an electric field on the order of $1\times10^7$ V/cm at the surface to provide a reduced potential barrier to facilitate quantum mechanical tunneling of electrons with finite probability, such that absorption of the photons having one of the first wavelength and the second wavelength provides one of a first current density of emitted electrons and a second current density of emitted electrons, respectively;

directing an optical signal substantially comprised of photons having one of a first wavelength and a second wavelength at a specific time onto the surface of the conductive/semiconductive material to generate one of the first current density of emitted electrons and the second current density of emitted electrons, respectively; and utilizing the generated current densities to indicate which of the first and second wavelength photons was directed onto the surface of the conductive/semiconductive material, wherein the step of directing an optical signal includes sequencing the optical signal over a period of time to include photons having none of and one of the first and second wavelengths such that associated current densities correspond to one of an OFF mode, a first ON mode and a second ON mode, respectively.

15. A method of discriminating optical signals by wavelength as claimed in claim 14 wherein the step of utilizing the generated current densities includes providing discrete levels of data information representative of first and second wavelength photons.

16. A method of discriminating optical signals by wavelength as claimed in claim 14 wherein the step of directing an optical signal includes directing an optical signal including a continuum of wavelengths over a portion of the optical spectrum such that the current density of emitted electrons is an analog electronic current.

17. A method of discriminating optical signals by wavelength comprising the steps of:

providing a wavelength discriminable optical signal detector including a conductive/semiconductive material having a surface with a geometric discontinuity for absorbing photons and emitting electrons, a first anode proximally disposed with respect to the surface of the conductive/semiconductive material, and a second anode distally disposed with respect to the surface of the conductive/semiconductive material for collecting emitted electrons;

coupling a first potential source between the conductive/semiconductive material and the first anode for inducing an electric field on the order of $1\times10^7$ V/cm at the surface of the conductive/semiconductive material to provide a reduced potential barrier for facilitating quantum mechanical tunneling of electrons with finite probability;

coupling a second potential source between the conductive/semiconductive material and the second anode, such that absorption of photons having one of the first wavelength and second wavelength provides one of a first current density of emitted electrons and a second current density of emitted electrons, respectively;

directing an optical signal substantially comprised of photons having one of a first wavelength and a second wavelength at a specific time onto the surface of the conductive/semiconductive material to generate one of the first current density of emitted electrons and the second current density of emitted electrons at the second anode, respectively; and utilizing the generated current densities at the second anode to indicate which of the first and second wavelength photons was directed onto the surface of the conductive/semiconductive material.

* * * * *